United States Patent [19]

Walto

[11] Patent Number: 4,609,146

[45] Date of Patent: Sep. 2, 1986

[54] SPRINKLER WITH IMPROVED RISER SEAL

[75] Inventor: Joseph J. Walto, Chaska, Minn.

[73] Assignee: The Toro Company, Minneapolis, Minn.

[21] Appl. No.: 744,306

[22] Filed: Jun. 13, 1985

Related U.S. Application Data

[63] Continuation of Ser. No. 530,349, Sep. 8, 1983, abandoned.

[51] Int. Cl.[4] ........................ B05B 15/10; F16J 15/32

[52] U.S. Cl. ........................ 239/123; 92/87; 92/168; 239/206; 277/24; 277/33; 285/110

[58] Field of Search ........................ 239/203-206, 239/123; 92/87, 168 R; 285/45, 110, 111, 302; 277/33, 24, 168, 169, 152, 167.5

[56] References Cited

U.S. PATENT DOCUMENTS

| | | | |
|---|---|---|---|
| 2,795,195 | 6/1957 | Amblard et al. | 277/24 UX |
| 3,421,604 | 1/1969 | Hobbs | 92/168 X |
| 3,724,757 | 4/1973 | Hunter | 239/205 |
| 3,733,030 | 5/1973 | Carstenson | 239/205 |
| 4,316,579 | 2/1982 | Ray et al. | 239/205 X |

*Primary Examiner*—Andres Kashnikow
*Attorney, Agent, or Firm*—Banner, Birch, McKie & Beckett

[57] ABSTRACT

A sprinkler including a housing, a riser and a riser seal element is disclosed. The housing has a hollow interior with an upward-inward slanted, conical shaped seal element receiving slot. The riser is mounted in the hollow interior of the housing for reciprocating motion between an extended sprinkling position and the retracted non-sprinkling position. The riser has an exterior surface along its length and the housing has an interior surface at its upper end between which a gap is defined. The riser seal element is comprised of an elastic material and has an outer portion which is held in the seal element receiving slot to thereby position the seal element in an upward, generally conical orientation. An inner portion of the seal element extends into the gap to form a seal therein for preventing the entry of extraneous material through the gap. The inner portion of the seal element is flexible between an upwardly slanted position and a downwardly flexed position.

18 Claims, 5 Drawing Figures

SPRINKLER WITH IMPROVED RISER SEAL

This application is a continuation of application Ser. No. 530,349, filed Sept. 8, 1983, now abandoned.

TECHNICAL FIELD

The present invention relates broadly to sprinklers used in irrigation and commercial or residential water application. More particularly, the invention relates to an improved riser seal element which forms a seal about a "pop-up" riser of a sprinkler.

BACKGROUND OF THE INVENTION

Sprinkler systems are used to water agricultural areas, and larger municipal and residential areas. Such a system typically includes a plurality of sprinklers interconnected by one or more water supply lines, which, in turn, are connected to a water source. A typical sprinkler includes a hollow housing coupled to the water supply and an outlet nozzle for directing a spray of water in a desired pattern. Frequently the nozzle is carried on a "pop-up" riser which is spring biased to a retracted position within the housing, and pops out of the housing when sufficient water pressure is applied to the sprinkler. In order to permit the riser to move between an extended water application position and the retracted position within the housing, a slight gap exists between the exterior surface of the riser and the interior surface of the housing about its upper end.

Seal elements have been inserted in the gap in order to prevent dirt and other undesirable extraneous material from entering through the gap into the interior of the housing. One type of prior art riser seal is formed of a relatively stiff flat piece of rubber. The flat piece of rubber is inserted at the top of the housing in its normal flat configuration and a removable top is secured above the seal element to hold it on top of the housing. Since the seal element is held in a flat condition, its entire inner edge contacts the exterior surface of the riser in the normal position of the seal element. Such edge contact results in a fair amount of interference between the seal element and the riser body. However, during retracting motion of the riser, the seal element bends downward away from the edge contact position to a position where the interference between the seal element and the riser body is reduced. Reduction of interference during retraction of the riser body is undesirable because the interference of the seal element on the riser body performs a wiping function to remove dirt from the riser body. It is also desirable to place the seal element as close as possible to the ground line, i.e., as close to the top of the sprinkler as possible, so that a minimum amount of area is present in the gap above the seal into which dirt can accumulate. In this type of prior seal element, the removable top must be made relatively thin and, hence, somewhat weak in order to accomplish this objective.

Another type of prior art seal element is molded directly into the removable top or cap. This seal element is formed of relatively rigid rubber or rubber-like material and includes a relatively thick ring-shaped section molded into the cap, and a vertical section extending upward and downward from the ring-shaped section. The vertical section includes upper and lower sealing tips which contact the riser element. While this type of seal element accomplishes the objective of placing the seal element near the ground line, without weakening the removable cap, its shape and construction technique are relatively complicated and expensive.

To date, no prior art seal has been developed which accomplishes the objective of locating a riser seal element near the ground line in a reliable, relatively inexpensive manner, without adversely affecting the strength of the removable top.

SUMMARY OF THE INVENTION

The present invention is directed to a sprinkler for sprinkling a liquid. The sprinkler includes a housing, a riser, and riser seal means. The housing has a hollow interior, and the riser directs liquid from the sprinkler. The riser is mounted in the hollow interior of the housing for reciprocating motion between an extended sprinkling position and a retracted non-sprinkling position. The riser has an exterior surface and the housing has an interior surface at its upper end between which a gap is defined for permitting the reciprocating motion of the riser relative to the housing. The riser seal means seals the gap and includes means for increasing the interference between the seal means and the exterior surface of the riser during the retracting motion of the riser whereby the wiping effect of the seal means on the exterior surface of the riser is enhanced.

In a preferred embodiment, the housing has an upward-inward slanted seal element receiving slot. The seal means includes a riser seal element comprised of an elastic material having an outer portion which is held in the seal element receiving slot so that the seal element is positioned in an upward-inward orientation, i.e., in an upwardly directed conical configuration. An inner portion of the seal element extends into the gap to form a seal therein for preventing the entry of extraneous material through the gap. The inner portion of the seal element is flexible between an upwardly slanted position and downwardly flexed position.

In a preferred embodiment, the elastic material is relatively thin and, in an unstressed condition is substantially flat. However, the elastic material is placed under stress when it is held in the seal element receiving slot so that the inner portion of the seal element is biased to the upwardly slanted position. During the downward motion of the riser, the inner portion of the seal element is flexed downwardly against its bias, and increases its interference against the exterior surface of the riser to enhance the wiping effect of the seal element on the riser. Also, at some point during the retracting motion of the riser the inner portion of the seal element moves rapidly upward because of its internal bias to thereby flip any dirt or extraneous material above it out of the gap.

The housing typically includes a removable top and the seal element receiving slot is defined between a lower surface of the top and an upper surface of a retainer held on the top of the housing. Since the receiving element is slanted upward, the removable top can be made relatively sturdy by having the upper section of the removable top taper from an outer thick area to a thinner area adjacent the gap.

In a preferred embodiment of the invention, the hollow interior of the housing is generally cylindrical, as is the exterior surface of the riser. The exterior surface of the riser has a first diameter, and the seal element is formed as a ring with an inner diameter slightly less than the first diameter. The seal element can be readily constructed by forming a thin circular disk of rubber and punching out a hole of the diameter slightly less than the first outer diameter of the riser. The elastic material of the seal element is preferably a thin, unreinforced rubber or rubber-like material which is highly flexible. For example, Buna Nitrile with a thickness between 0.010" and 0.050", and preferably 0.032". The seal element per se of the present invention can be used in any type of pop-up sprinkler including but not limited to model 570 series sprinklers manufactured by The Toro Company.

Various advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

DETAILED DESCRIPTION OF THE INVENTION

Figure 1:
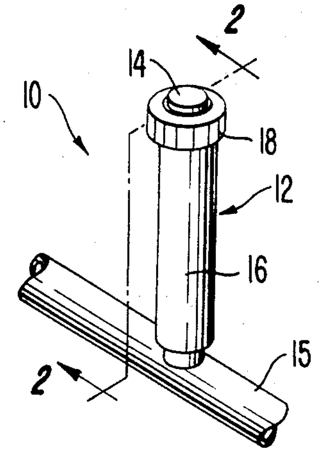
FIG. 1 is a perspective view of a sprinkler in accordance with the present invention.

Referring to the drawings in detail, wherein like numerals indicate like elements, there is shown in FIG. 1 a sprinkler in accordance with the present invention, designated generally as 10. Sprinkler 10 includes a generally cylindrical housing 12 and generally cylindrical riser 14. Housing 12 and riser 14 can be molded of a relatively hard plastic material. Riser 14 includes a nozzle at its upper end through which liquid exits the sprinkler. Liquid is supplied to sprinkler 10 through a supply conduit 15.

Figure 2:
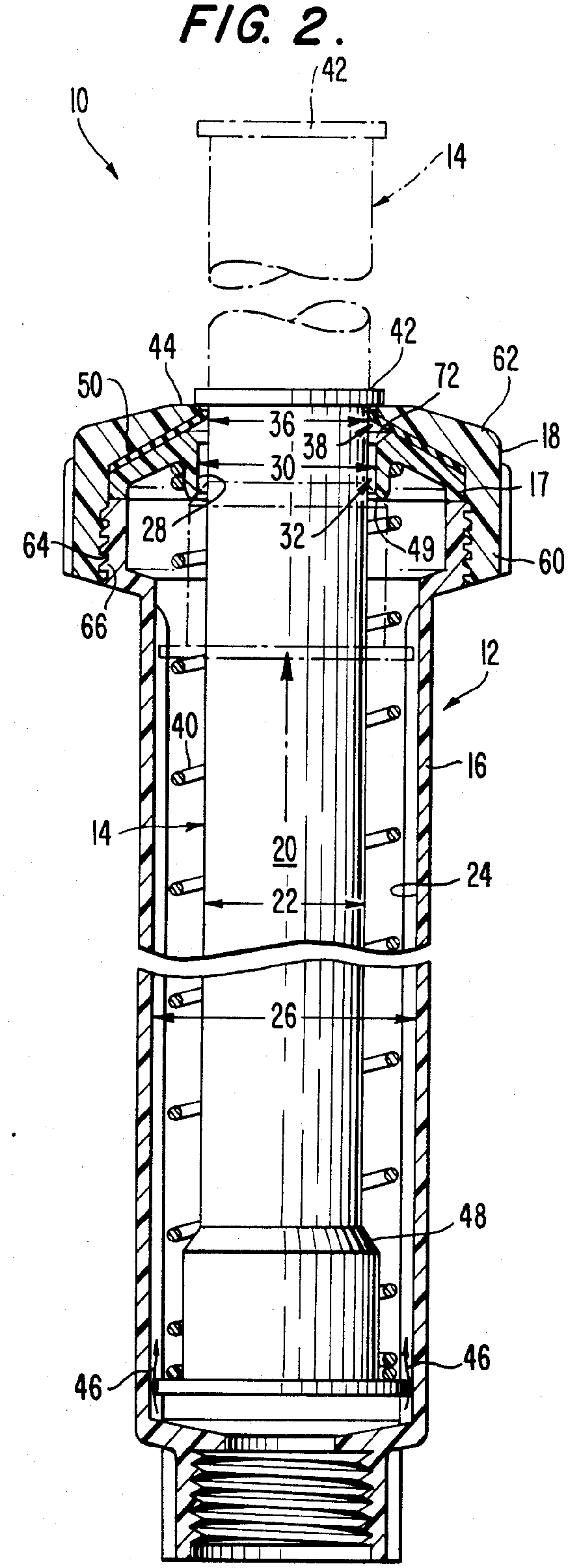
FIG. 2 is a vertical sectional view taken generally along lines 2—2 of FIG. 1.

Housing 12 includes an elongate main body portion 16, a seal retainer 17, and a removable top or cap 18. Seal retainer 17 fits on top of an upper edge of main body portion 16 and is held in position by top 18. Riser 14 has a cylindrical exterior surface 20 with a first diameter 22 extending along substantially its entire length. Main body portion 16 has a generally cylindrical interior surface 24 with a second diameter 26 extending along a major portion of its length. Seal retainer 17 has a generally cylindrical interior surface 28 of a third diameter 30. Second diameter 26 is substantially greater than first diameter 22, while third diameter 30 is only slightly greater than first diameter 22. A relatively small annular gap 32 thus exists between exterior surface 20 of riser 14 and interior surface 28 of seal retainer 17. Top 18 similarly has a generally cylindrical interior surface 34 with a fourth diameter 36, slightly greater than first diameter 22. A small gap 38 is thus defined between the exterior surface 20 of riser 14 and the interior surface 34 of top 18. Riser 14 is thus free to move between an upper extended position (shown in phantom line in FIG. 2) wherein sprinkling occurs, and a lower retracted position (shown in full line in FIG. 2) wherein no sprinkling occurs. Riser 14 is spring biased to the retracted position by a spring 40 received about riser 14 and within housing 12 between exterior surface 20 and interior surface 24.

In the retracted position, a ledge 42 at the upper end of riser 14 rests on a top surface 44 of removable top 18 and thus covers gaps 32 and 38. Upon application of sufficient water pressure, riser 14 moves upwardly against the bias of spring 40, water passes through the interior of riser 14, and sprinkling occurs through a nozzle at the top of riser 14. During its upward motion, a slight amount of water passes through a small gap between interior surface 24 and the lower periphery of riser 14, as shown by arrows 46, and enters the area between the exterior surface of riser 14 and the interior surface of housing 12. This water functions as flushing water to flush gaps 32, 38 of any miscellaneous debris. When riser 14 reaches its uppermost position, a chamfer 48 contacts a mating chamfer 49 on seal retainer 17 and seals off the flow of any additional flushing water.

Figure 5:
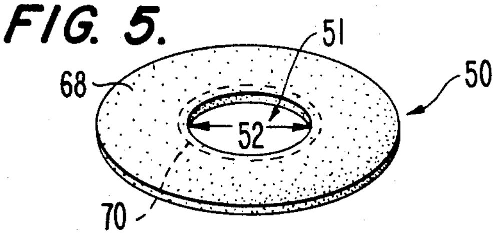
FIG. 5 is a perspective view of a riser seal element in accordance with the present invention, in an unstressed condition prior to its insertion into the sprinkler.

A seal element 50 functions to prevent the entry of dirt or other undesirable material into gaps 32 and 38. As best seen in FIG. 5, seal element 50 is formed of a ring-shaped piece of relatively thin elastic material with a central hole 51. Seal element 50 is preferably formed of a rubber or rubber-like material such as Buna Nitrile, with a thickness between approximately 0.010" and 0.050". Seal element 50 is thus easily flexed. Central hole 51 can be formed by merely punching out the material in the center of a rubber disc. Hole 51 preferably has a diameter 52 which is slightly less than diameter 22 of the exterior surface of riser 14.

Seal element 50 is placed between an upper surface 56 of seal retainer 17 and a lower surface 58 of removable top 18. The area between surfaces 56, 58 defines a seal element receiving slot.

Top 18 includes a cylindrical section 60 and a tapered ring section 62. Cylindrical section 60 includes inwardly facing threads 64 which mate with exteriorly facing threads 66 of housing 12. Ring section 18 extends inward from the upper end of cylindrical section 60 and includes a thicker outer area which tapers to a thinner inner end at inner surface 34. This tapered configuration strengthens top 18 because the outer boarder can be made relatively thick, as compared to a top which must be substantially flat and thin along its entire upper width.

Both upper surface 56 and lower surface 58 are inclined upwardly and inwardly toward the central axis of housing 12. Seal element 50 is attached to sprinkler 10 by fitting around exterior surface 20 of riser 14 and by being sandwiched between the upper surface 56 of seal retainer 17 and the lower surface 58 of removable top 18. In this position, ring 50 takes on an upwardly directed, conical configuration and is placed under stress. An outer portion 68 of the seal element 50 is received between surfaces 56 and 58, while an inner portion 70 extends into gaps 32, 38. Outer portion 68 is substantially larger than inner portion 70, and in fact comprises a major portion of seal element 50. With seal element 50 in its stressed condition, inner portion 70 is biased in the upwardly inclined position shown in FIGS. 2 and 3.

Figure 3:
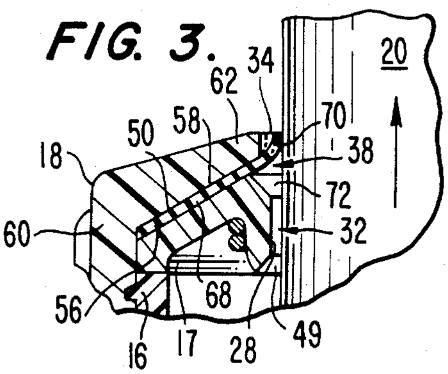
FIG. 3 is a partial, vertical sectional view of the upper end of the sprinkler illustrating the riser in its upward motion.

When sprinkler 10 is shut off and riser 14 is in its retracted position, inner portion 70 of seal element 50 makes line contact with exterior surface 20 of riser 14, as seen in full line in FIG. 3. This line contact occurs very near the upper edge of gap 38 so that very little room exists in gap 38 above the contact line of seal element 50. For example, it is preferred that the line contact is made as close to the top surface of cap 18 as gap 38 is wide. In one exemplary sprinkler construction, gap 38 is approximately sixty thousandths of an inch, so that the line contact of seal element 50 with riser 14 is made within approximately sixty thousandths of an inch of the top surface of cap 18. While riser 14 is moving upward, the flushing water bends inner portion 70 of seal element 50 further upward out of contact with riser 14 to a position where the inner edge of seal element 50 is approximately level with the top surface of cap 18, as shown in dashed line in FIG. 3. Once riser 14 reaches its fully extended position and the flow of flushing water has stopped, inner portion 70 of seal element 50 returns to its normal orientation in line contact with riser 14. Since this sealing line contact is made very near the top of gap 38, very little area remains in gap 38 for accumulating dirt during the sprinkling operation.

Figure 4:
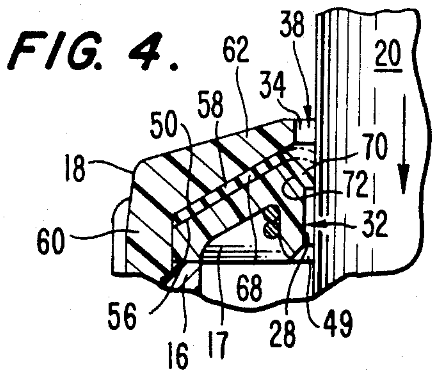
FIG. 4 is a partial, vertical sectional view of the upper end of the sprinkler, illustrating the riser during part of its downward motion.

During downward motion of riser 14, inner portion 70 of seal element 50 bends downwardly as shown in FIG. 4. An inwardly and downwardly sloped surface 72 is formed along the upper inner edge of main body portion 16, and permits inner portion 70 of seal element 50 to flex further downward. In this downward flexed position, seal element 50 performs a scraping or wiping function on exterior surface 20 of riser 14 to remove any dirt which has accumulated on surface 20. The interference between seal element 50 and exterior surface 20 increases in this downward flexed position, over the interference which is present in the normal orientation of seal element 50, to thereby enhance the wiping function of seal element 50 during the downward motion of riser 14. This increase in interference occurs because inner portion 70 of seal element 50 contacts surface 20 over an extended surface area, rather than along a line, as shown in full line in FIG. 4; and because outer portion 70 has a tendancy to return to its upwardly slanted normal orientation. The composition and disposition of seal element 50 thus functions as a mechanism for increasing the interference between seal element 50 and exterior surface 20 of riser 14. Also, sometime during the downward motion of riser 14, inner portion 70 flexes back upward because of its stressed upward bias and flips any debris or dirt in gaps 32, 38 upward and out of sprinkler 10. An intermediate position between the lowermost and uppermost positions of inner portion 70 is shown in dashed line in FIG. 4. The inner sealing portion 70 of seal element 50 thus performs an enhanced wiping function, and undergoes a flip-flop action during the downward motion of riser 14.

Seal element 50 accomplishes the sealing function about riser 14 in a simple, inexpensive manner because it is formed of inexpensive material and is attached to the sprinkler in an uncomplicated manner. The orientation of seal element 50 allows top 18 to be shaped so that the sealing edge of the seal is located near the ground line while the strength of top 18 is not lessened. Also, seal element 50 functions as a wiper of the exterior surface of riser 14, which, because of its structure and design also functions as a means for increasing the interference on the exterior surface of riser 14 during the downward motion of riser 14.

Numerous characteristics and advantages of the invention have been set forth in the foregoing description, together with details of the structure and function of the invention, and the novel features thereof are pointed out in the appended claims. The disclosure, however, is illustrative only and changes may be made in detail especially in matters of shape, size and arrangement of parts, within the principal of the invention, to the full extent indicated by the broad general meaning of the terms in which the appended claims are expressed.

I claim:

1. A sprinkler for sprinkling a liquid comprising:

a housing having a hollow interior;

a riser for directing liquid from the sprinkler, said riser being mounted in the hollow interior of said housing for reciprocating motion between an extended sprinkler position and a retracted non-sprinkling position, said riser having an exterior surface and said housing having an interior surface at its upper end between which a gap is defined for permitting the reciprocating motion of said riser relative to said housing; and riser seal means for sealing said gap, said riser seal means in a normal orientation contacting the exterior surface of said riser with a first contact area to create a first interference between said seal means and the exterior surface of said riser, said riser seal means including means for increasing the contact area of said seal means with the exterior surface of said riser from said first contact area to a second greater contact area in order to increase the interference between said seal means and the exterior surface of said riser during the retracting motion of said riser whereby the wiping effect of said seal means on the exterior surface of said riser is enhanced during the retracting motion.

2. A sprinkler in accordance with claim 1 wherein said seal means includes a flexible seal element of an elastic material contacting the exterior surface of said riser along a line contact in its normal orientation and movable downward during the retracting motion of said riser to contact the exterior surface of said riser along an extended surface of said seal element.

3. A sprinkler in accordance with claim 2 including means for holding said seal element in a stressed, upwardly biased orientation in which said seal element is in its normal line contact with the exterior surface of said riser.

4. A sprinkler in accordance with claim 3 wherein said holding means includes conical, upward slot formed in said housing and said elastic material of said seal element being flat in an unstressed condition and being placed in said stressed condition when held in said slot.

5. A sprinkler for sprinkling a liquid comprising:

a housing having a hollow interior and an upward-inward slanted seal element receiving slot;

a riser mounted in the hollow interior of said housing for reciprocating motion between an extended sprinkling position and a retracted non-sprinkling position, said riser having an exterior surface along its length and said housing having an interior surface at its upper end between which a gap is defined for permitting the reciprocating motion of said riser relative to said housing; and a riser seal element comprised of an elastic material, an outer portion of said seal element being held in said slot to position the seal element in an upward-inward orientation, and an inner portion of said seal element extending into said gap to form a seal therein for preventing the entry of extraneous material through the gap, said inner portion of said seal element being flexible between an upwardly slanted position and a downwardly flexed position, in said upwardly slanted position said seal element contacting the exterior surface of said riser with a first contact area and in said downwardly flexed position contacting the exterior surface of said riser with a second contact area greater than said first contact area.

6. A sprinkler in accordance with claim 5 wherein said elastic material is relatively thin, in an unstressed condition is substantially flat, and is placed under stress when held in said seal element receiving slot to bias the inner portion of said seal element to the upwardly slanted position.

7. A sprinkler in accordance with claim 5 wherein said housing includes a removable top and said seal element receiving slot is defined between a lower surface of said top and an upper surface of the remainder of said housing.

8. A sprinkler in accordance with claim 5 including biasing means for biasing said riser to said retracted position.

9. A sprinkler in accordance with claim 5 wherein said exterior surface of said riser and said interior surface of said housing are circular.

10. A sprinkler for sprinkling a liquid comprising:

a housing having a main body portion and a removable top, a hollow interior extending through said main body portion and removable top, and an upwardly directed, generally conical shaped seal element receiving slot located adjacent its upper end;

a riser mounted in the hollow interior of said housing for reciprocating motion between an extended sprinkling position and a retracted non-sprinkling position, said riser having an exterior surface along its length and said housing having an interior surface at its upper end between which a gap is defined for permitting the reciprocating motion of said riser relative to said housing;

spring means for biasing said riser to said retracted position; and a riser seal element comprised of a relatively thin elastic material, an outer portion of said seal element being held in said slot to position the seal element in an upward, generally conical configuration, and an inner portion of said seal element extending into said gap to form a seal along a substantially line contact with said exterior surface of said riser for preventing the entry of extraneous material through the gap, said seal element making said line contact at a distance below the top surface of said removable top, said distance being approximately equal to the spacing of said gap, said elastic material in an unstressed condition being substantially flat and being placed under stress when held in said element receiving slot to bias the inner portion of said seal element to the upwardly slanted position, said inner portion of said seal element being flexible between an upwardly slanted normal position during which said line contact is made and a downwardly flexed position against its bias during the downward motion of said riser to wipe the exterior surface of said riser of extraneous material.

11. A sprinkler in accordance with claim 10 wherein said main body portion of said housing has a threaded exterior surface adjacent its upper end, and said removable top has a threaded interior surface mating with said threaded exterior surface.

12. A sprinkler in accordance with claim 11 wherein said removable top includes a cylindrical section containing said threaded exterior surface and an inwardly tapering ring section extending inward from the top of said cylindrical section, said ring section having a thick outer area and tapering toward a thinner inner end surrounding said gap.

13. A sprinkler in accordance with claim 10 wherein said seal element receiving slot is formed between an upper surface of a seal retainer and a lower surface of said top, said upper surface of said seal retainer includes an upward inclined, conical portion against which said outer portion of said seal element rests and a downward inclined portion, extending inward of said housing and facing said gap and into which said inner portion of said seal element flexes downward.

14. A sprinkler in accordance with claim 10 wherein said spring means includes a spring supported between the exterior surface of said riser and the interior surface of said housing.

15. A sprinkler for sprinkling a liquid comprising:

a housing having a main body portion with a seal retainer and a removable top, a hollow generally cylindrical interior extending through said main body portion and removable top, said main body portion of said housing having a threaded exterior surface adjacent its upper end, and said removable top having a threaded interior surface mating with said threaded exterior surface, and an upwardly directed, generally conical seal element receiving slot located between an upper surface of said seal retainer and a lower surface of said removable top;

a generally cylindrical riser mounted in the hollow interior of said housing for reciprocating motion between an extended sprinkling position and a retracted non-sprinkling position, said riser having an generally cylindrical exterior surface along its length with a first diameter and said housing having a generally circular interior surface at its upper end with a larger second diameter between which a gap is defined for permitting the reciprocating motion of said riser relative to said housing;

spring means for biasing said riser to said retracted position; and a riser seal element comprised of a relatively thin elastic material having an annular shape with an inner diameter and an outer diameter, an outer portion of said seal element being held in said slot to position the seal element in an upward, generally conical orientation, and an inner portion of said seal element extending into said gap with said inner diameter of said seal element being less than said first diameter to form a seal about said riser for preventing the entry of extraneous material through the gap, said elastic material in an unstressed condition being substantially flat and being placed under stress when held in said element receiving slot to bias the inner portion of said seal element to the upwardly slanted position, said inner portion of said seal element being flexible between the upwardly slanted position and a downwardly flexed position against its bias during the downward motion of said riser to wipe the exterior surface of said riser of extraneous material.

16. A sprinkler in accordance with claim 15 wherein said seal element makes line contact at a distance below the top surface of said removable top which is approximately equal to the spacing of said gap.

17. A sprinkler in accordance with claim 15 wherein said housing and riser are formed of a hard plastic.

18. A sprinkler in accordance with claim 15 wherein said seal element is formed of rubber having a thickness between approximately 0.010" and 0.050".

* * * * *